March 1, 1966 M. G. PAWLEY ET AL 3,238,297

SUBSCRIPTION TELEVISION SYSTEM

Original Filed June 8, 1951 7 Sheets-Sheet 1

INVENTORS
Myron G. Pawley
Jacob M. Sacks
BY John J. Pederson
ATTORNEY

March 1, 1966 M. G. PAWLEY ET AL 3,238,297

SUBSCRIPTION TELEVISION SYSTEM

Original Filed June 8, 1951 7 Sheets-Sheet 2

INVENTORS
Myron G. Pawley
Jacob M. Sacks,

BY John J. Pederson

ATTORNEY

SUBSCRIPTION TELEVISION SYSTEM

Original Filed June 8, 1951 7 Sheets-Sheet 3

INVENTORS
Myron G. Pawley
Jacob M. Sacks,
BY John J. Pedersen
ATTORNEY

SUBSCRIPTION TELEVISION SYSTEM

Original Filed June 8, 1951 7 Sheets-Sheet 4

INVENTORS
Myron G. Pawley
Jacob M. Sacks,
BY John J. Pederson
ATTORNEY

INVENTORS
Myron G. Pawley
Jacob M. Sacks,
BY John J. Pederson
ATTORNEY

March 1, 1966 M. G. PAWLEY ET AL 3,238,297

SUBSCRIPTION TELEVISION SYSTEM

Original Filed June 8, 1951 7 Sheets-Sheet 6

INVENTORS

Myron G. Pawley

Jacob M. Sacks,

BY

John J. Pederson

ATTORNEY

INVENTORS
Myron G. Pawley,
Jacob M. Sacks,
BY John J. Pederson
ATTORNEY

United States Patent Office 3,238,297
Patented Mar. 1, 1966

3,238,297
SUBSCRIPTION TELEVISION SYSTEM

Myron G. Pawley, Riverside, and Jacob M. Sacks, Corona, Calif., assignors to Zenith Radio Corporation, a corporation of Delaware Original application June 8, 1951, Ser. No. 230,618, now Patent No. 2,816,156, dated Dec. 10, 1957. Divided and this application Dec. 5, 1957, Ser. No. 700,854
3 Claims. (Cl. 178—22)

The present invention relates generally to image transmission or television systems of the subscriber type. More particularly, the system of the present invention provides a transmitting station which broadcasts an image which cannot be received by the conventional receiver or the image received will be so distorted or jittered that it cannot be viewed normally. The subscribers' receiving stations, however, are each provided with a coder unit which corresponds to a similar coder unit at the transmitting station. By means of these coder units the pictures or images received by the subscribers are corrected for distortion or jitter and appear normal. This is a divisional application of copending application Serial No. 230,618, filed June 8, 1951, and issued December 10, 1957, as Patent 2,816,156, and assigned to the present assignee.

Broadly, the coder units at the transmitter and at the subscribers' receivers can be adjusted to vary the scanning code to effect variably abnormal scanning from program to program. For any one program, all coder units produce the same scanning code. Alternately, the coder units can be arranged to effect reversal in the polarity of the video signal, or other abnormal switching or operation. If desired, the same coder units can be arranged for simultaneously controlling the electronic switching of sound-scrambling devices. In this manner the audio as well as the video signals received with the conventional television set are distorted unless the distortion is removed by suitable decoding apparatus at the subscriber's television set.

In order to provide for varying the scanning code from program to program, each coder unit at the transmitter and at each subscriber's receiver is provided with adjustable devices or variable setting means, such as a series of two-position toggle switches, which need to be set for each program in order to have the coder unit produce the selected scanning code which is being produced by the transmitter coder unit. While all coder units are thereby set to produce the same scanning code, it will be seen that the setting of each series of two-position toggle switches is individual to each receiving station for any selected code. Thus each receiver coder unit has a key code or individual combination which prescribes the setting of the adjustable devices or two-position switches to correspond with any given transmitter scanning code.

Under the present system, therefore, when a subscriber wishes to receive a program he communicates with the transmitting station by telephone, by mail, or in any desirable manner and he obtains the key code individual to his receiver for the specific program. This key code or switch setting combination advises him how to set the switches on his coder unit, and when he so sets the switches, the coder unit will produce the same scanning code as that produced at the transmitting station. The subscriber's receiver will then be in phase with the transmitter and will properly reproduce the image being televised. The key code of any one subscriber for a specific program will differ from the corresponding key codes of all or substantially all other subscribers in the area.

Another feature of the present system is that the coder unit employed generates a binary code which is represented by a repeated group of ON or OFF pulses.

A further feature of the present invention is that all the coder units in the entire system, including the transmitting station and all subscribers' stations, are controlled by the vertical synchronizing pulse which is generated by the transmitter and broadcast with the video signal. The controlling operations are performed during the vertical retracing time when the screen is blanked out.

A still further feature of the present system is that a reduced frequency resetting pulse or signal is derived from the vertical synchronizing signal and employed for maintaining all coder units properly energized and operating in synchronism. For this purpose the composite video and synchronizing signal broadcast by the transmitter also contains this code system synchronizing pulse or reset signal which is employed at the receiver in the same manner as at the transmitter, namely, to energize and operate the coder unit in phase with its counterpart at the transmitter.

It is an object of the present invention to provide a new and improved subscription television arrangement that may be employed in either a transmitter to effect coding or in a receiver to achieve decoding.

A subscription television system, constructed in accordance with one aspect of the invention, comprises a secrecy device having a plurality of distinct operating conditions each of which establishes a different operating mode in the system. A control mechanism is coupled to the secrecy device and has plurality of stable operating conditions, each of which is effective to establish the secrecy device in an assigned one of its operating conditions. A plurality of input circuits are provided for the control mechanism and each of these selectively energizable to operate the control mechanism to a different assigned one of its operating conditions. The system has a first signal source including an adjustable code-determining switching apparatus for developing a first series of code signal pulses having an irregular time spacing determined at least in part by the instantaneous adjustment of said code-determining switching apparatus and also a second signal source for developing a second series of code signal pulses, the first and second series of pulses collectively representing a code schedule. Mean coupled to the first signal source and to one of the input circuits are provided for utilizing the code signal pulses of the first series to selectively energize the one input circuit. Finally, the subscription television system includes means coupled to second signal source and to another one of the input circuits for utilizing the code signal pulses of the second series to selectively energize the other input circuit, whereby the control mechanism is operated between its operating conditions in accordance with the code schedule.

In accordance with another aspect of the invention, a subscription television system is provided which receives a scrambled picture transmission wherein picture signals are transmitted in one of a plurality of different modes during different time periods which occur at a rate sufficient to render an unauthorized receiver display unintelligible and wherein signals are transmitted representing the operation of commutation means at the transmitter. The receiver comprises means for resolving the different modes of the picture signals, and means including commutation means coupled to the resolving means for determining from time to time the mode resolved in the resolving means. Means are provided for detecting the transmitted signals and coupled with the commutation means for maintaining synchronization of the receiver commutation means with corresponding commutation means at the transmitter. The receiver also includes changeable matrix means connected between the mode resolution means and the receiver commutation means for determining the mode to be resolved for given states of the commutation means.

The organization and manner of operation of the present invention and further objects and advantages thereof may be best understood by reference to the following specification and the accompanying drawings, it being understood that these serve to illustrate an embodiment of the invention, and that variations thereof falling within the scope of the appended claims will be apparent to persons skilled in the art.

Figure 1:
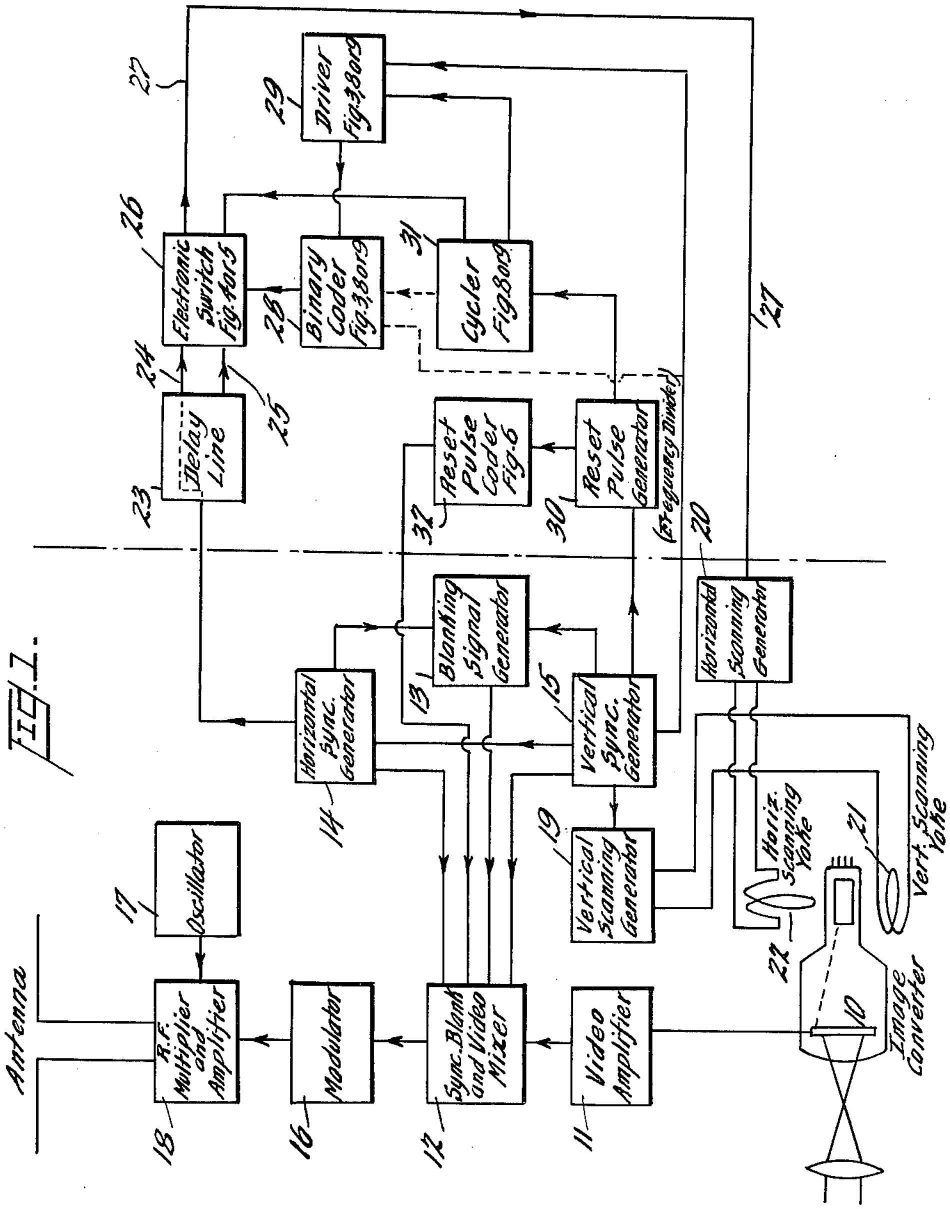
FIGURE 1 is a block diagram of a transmitting station embodying the invention.

In FIGURE 1 the transmitting system illustrated provides that the horizontal scanning in the camera should recurrently step out of time or out of phase with the horizontaly synchronizing signal as broadcast. This recurrent time or phase shift is varied in accordance with a code of ON or OFF pulses generated by the coder unit. It will be understood, however, that this represents only one type of jitter or distortion and the other types of jitter or distortion or abnormal operation may be effected by means of the present invention, such as a coded reversal in polarity of the video signal, or reversal in the direction of scanning.

In the system shown in FIGURE 1, picture signal generating tube 10 may be of any desirable type which delivers the video signal to video amplifier 11. The amplified video signals are then transmitted to mixer 12 which receives the blanking, horizontal synchronizing, and the vertical synchronizing signals from their corresponding generators 13, 14 and 15. The composite signal is then passed to modulator 16 which modulates R.F. amplifier 18 which in turn supplies the signal to the antenna. The oscillator 17 supplies its output to R.F. amplifier 18.

The scanning of the image in the camera tube 10 is controlled by vertical scanning generator 19 and horizontal scanning generator 20 which provide scanning power to their respective yokes 21 and 22.

The parts thus far described are the usual elements of a conventional television transmitter and need not be described with any further detail. In the conventional television transmitter the horizontal synchronizing generator is connected directly to the horizontal sweep or scanning generator for the camera.

In the present system, however, delay line 23 is interposed between the horizontal synchronizing signal generator and the horizontal sweep generator at the transmitter. In the absence of the delay line the horizontal scanning would be in step with or in phase with the horizontal synchronizing signal. The interposition of the delay line between the synchronizing signal generator and the horizontal sweep generator provides for a time or phase shift between the horizontal scanning at the camera and the horizontal synchronizing signal as broadcast.

The present invention further provides that this shift should be variable in accordance with a code. For this purpose the delay line is provided with two outgoing leads 24 and 25. One of these leads, such as 24, may by-pass the delay line, whereas the other lead 25 is connected to the output of the delay line. Electronic switch or control mechanism 26 operates to connect either lead 24 or lead 25 to the horizontal sweep generator of the camera through wire 27.

Merely for the purpose of simplifying the present diagram, the delay line is shown with the two outgoing leads described above. It will be understood, however, that, if desired, the delay line may include several delay sections with a corresponding number of outgoing lead lines and a multi-postion electronic switch may then operate to vary the amount of delay as desired in accordance with the code.

The operation of the electronic switch is controlled by coder 28 which will be discussed more in detail in a later portion of this specification. At this point, however, it should be understood that coder unit 28 controls the operation of control mechanism or switch 26 in accordance with a code which may be varied as desired by the proper setting of an adjustable code-determining switching apparatus in the form of a plurality of toggle switches.

Broadly, the coder unit is an apparatus which receives regularly spaced pulses and then converts such regularly spaced pulses into a repeated binary code which is represented by irregularly spaced ON or OFF pulses, derived by the proper setting of a plurality of toggle switches. These ON or OFF pulses are delivered to the electronic switch or control mechanism which thereby serves to vary the connection of the delay line 23 to the horizontal scanning generator.

While the coder unit may be operated by any desired source of regularly spaced pulses, it is advantageous to operate it by the vertical synchronizing pulses which customarily recur at a rate of 60 per second. For this purpose the vertical synchronizing generator 15 at the transmitter is connected to electronic driver 29 of the coder.

The coder employed in the present system receives the regularly spaced vertical synchronizing pulses, which recur conventionally at a rate of 60 per second, and as a result of its operation it delivers at its output a repeated cycle of ON or OFF pulses representing binary digits, these pulses being in phase with the vertical synchronizing pulses. In order to maintain the operation of the coder and to eliminate all necessity for its adjustment during its operation, it is desirable to provide the coding system with a pulse which coincides with the first of each group of the code. Thus if the code provides for a group of 8 ON or OFF pulses, it is desirable to provide the coding system with a single pulse for every eighth vertical synchronizing pulse, the same, of course, to be in phase with the synchronizing pulses. This cycling pulse will be referred to as the reset or code system synchronizing pulse.

The reset pulse, it will be understood, serves at the transmitting station, and, as will appear later, also at the subscribers' receiving stations to synchronize the several components in each code system. For this purpose vertical synchronizing generator 15, which, as has been described, delivers its output to vertical scanning generator 19 for conventional vertical scanning, also delivers its output to reset pulse generator 30. Reset pulse generator 30 may be any suitable conventional frequency divider and operates to receive the vertical synchronizing pulses at the rate of 60 per second and deliver pulses at a reduced frequency, as for example one for every eight vertical synchronizing pulses, to cycler 31, shown in FIGURE 8. The frequency of the pulses delivered by the reset pulse generator is determined by the number of pulses in each code group. When, for example, the code group has eight ON or OFF pulses the reset pulse generator will be designed to deliver one reset pulse for every eight vertical synchronizing pulses. The reset pulses are delivered by generator 30 to reset pulse cycler or distributor 31 which distributes the reset pulses to the several components of the code system in order to maintain them in phase. Cycler 31 is therefore connected for this purpose to driver 29 which operates or drives the binary coder 28, and to the control mechanism 26 which serves to switch the delay line 23 into the connection from horizontal synchronizing generator 14 to horizontal scanning generator 20.

The vertical synchronizing generator which provides the conventional vertical synchronizing pulses for the entire television system, and as has been stated above, provides pulses to the reset pulse generator, also supplies its pulses to driver 29 of coder unit 28.

As will appear later, the present invention provides for the use of any suitable type of binary coder such as a counter chain which generates repeated groups of ON or OFF pulses which constitute a code, and more particularly the present invention may employ one of two types of binary coder which will be described in detail later but which will be here named as a magnetic binary coder and a rectifier network binary coder. The block 28 is intended to illustrate both types of coders. In the block diagram in FIGURE 1 binary coder 28 is shown connected by dotted lines to cycler 31 and to vertical pulse generator 15. This is to show that these two connections are alternatives and one or the other is employed, depending upon whether one or the other type of binary coder is employed at 28. When the magnetic binary coder is employed at 28 it is connected to cycler 31 and is thus energized once for each group of code pulses by the reset pulse; when the diode network is employed as the coder at 28 then it is connected to vertical pulse generator 15 and the network operates to transmit the vertical pulse to the electronic switch or control mechanism 26 for an ON pulse, or to shunt the pulse to ground to produce an OFF pulse in the code. This action will be described in more detail later.

It may now be stated, by way of recapitulating what has thus far been described, that in the television system of the present invention, the transmitting station employs a binary coder, which may be magnetic, or may be a diode network or any other suitable type, its essential feature being that it can deliver to the electronic switch a repeated code consisting of ON or OFF pulses. The electronic switch in turn is operated thereby to connect varied portions of a delay line between the horizontal synchronizing generator and the horizontal sweep generator. This coding system is under the control of the vertical synchronizing pulses and the several components thereof are maintained in synchronism or in phase by a reset pulse which is derived from the vertical synchornizing pulse by a frequency divider.

What has been said above with reference to the code system of the transmitting station is also applicable to the code system of each subscriber's station, and each subscriber's station also contains a code system which is substantially identical with the code system as thus far described. The code systems of the subscribers' stations are maintained in synchronism with the code system of the transmitting station by means of the reset pulse which is broadcast as part of the composite video and synchronizing signal transmitted or broadcast by the conventional television transmitting station. For this purpose the reset pulses generated at 30 are delivered to reset pulse coder 32 which shapes or codes the reset pulse so that the same can be readily separated from the other synchronizing pulses at the receiving station. The specific type of pulse coder employed here and which will be described more in detail in a later portion of the specification, substitutes a coded double pulse for the single reset pulse, and this double coded pulse is delivered to mixer 12 and transmitted with the conventional synchronizing pulses and video signal.

In FIGURE 1, the dashed line divides the block diagram into two parts, in which the part that includes the picture converter 10 and the elements 11 to 12, inclusive, constitute a conventional transmitter, while the other part of FIGURE 1 shows in block diagram the coding system including the components 23–32, inclusive, the diagram also showing the manner in which the coding system is related to the conventional transmitter.

Before considering the receiver, it is best to consider the coding system employed at the transmitter in more detail. Many parts of the coding system are well known or are found in the literature relating to electronics and, therefore, will not be described in full detail.

An understanding of the present coding system necessitates first an understanding of the coder unit 28. It has already been stated that the coder unit employed in the present system receives a sequence of regularly spaced pulses and delivers a repeated series of ON or OFF pulses. The preferred form of the coder unit may be briefly referred to as a diode binary coder unit and is shown in schematic form in FIGURE 3.

The theory of operation of the general type of circuit used in this coder is presented in a paper entitled, "Rectifier Networks for Multiposition Switching," by D. R. Brown and N. Rochester, Proceedings of the I.R.E. February 1949, pp. 139–147, and the same is embodied herewith and made a part of the present specification by reference.

For simplicity, the particular arrangement illustrated in the drawings and to be described generates successive groups of eight binary digits represented by ON or OFF pulses, but it is clear that the coder unit may readily be enlarged or extended so as to produce groups of any required number of binary digits with optional switch arrangements for setting up the scanning code in corresponding with a key code for the switches.

Figure 3:
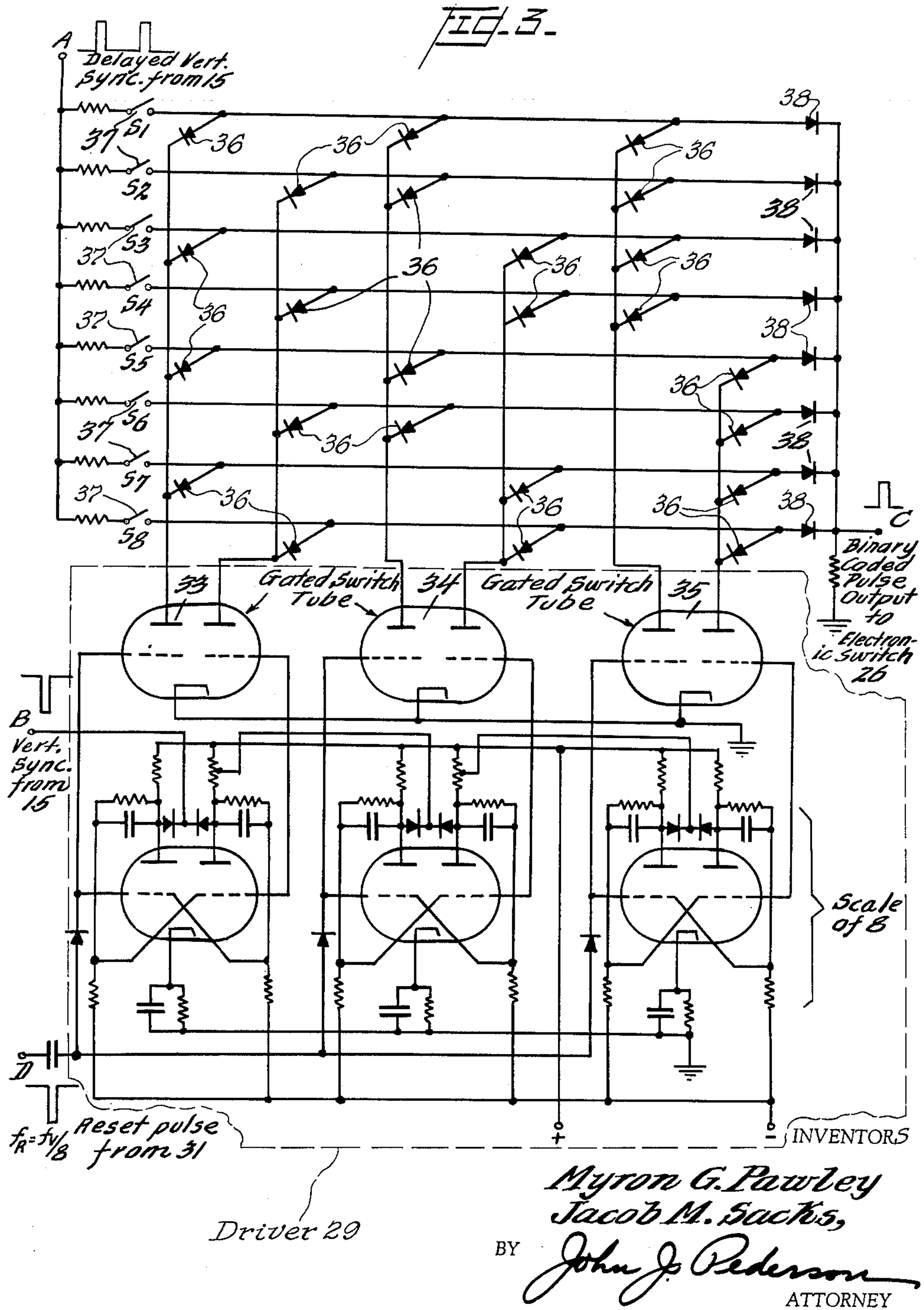
FIGURE 3 is a schematic showing of a binary coder employing a rectifier network and its driver unit.

The diode binary coder shown in FIGURE 3 comprises a network of eight horizontal leads and six vertical leads which are interconnected by the unidirectional diodes 36 as shown. Each horizontal lead has a two-position switch 37 connecting the same to the input A through a suitable resistor. At the output end the horizontal leads are each connected to the output C through the diodes 38. Switches 37 collectively constitute an adjustable code-determining switching apparatus.

Figure 2:
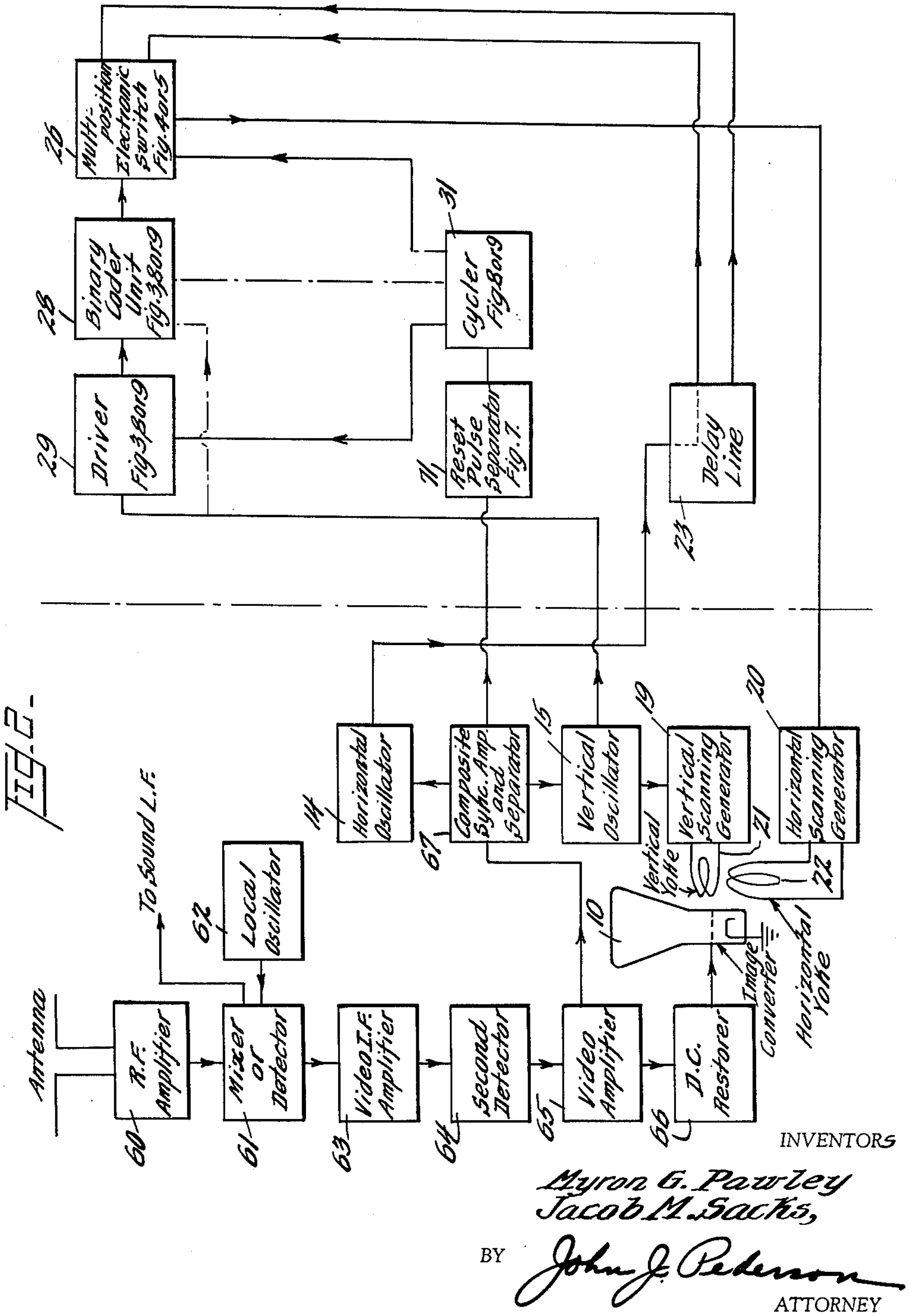
FIGURE 2 is a block diagram of a subscriber's station embodying the invention.

This network is indicated in FIGURES 1 and 2 by block 28. FIGURE 3 also shows the driver (shown in FIGURES 1 and 2 in block 29) for the binary coder, which consists here of a bank of three tubes forming a scale of eight system and three gated switch tubes 33, 34 and 35.

In this system the switching tubes 33, 34 and 35 remain energized and the current in each tube alternates from one plate circuit to the other repeatedly. In tube 33 this alternation or switching takes place at each vertical pulse; tube 34 switches every two vertical pulses and tube 35 switches for every fourth vertical pulse.

By means therefore of this operation of the switch tubes 33, 34 and 35 half the vertical lines in the network are grounded and the other half are ungrounded at any particular instant. The diodes or unidirectional elements 36 are disposed to connect the vertical lines with the horizontal lines so that at all times only one horizontal line is ungrounded and a pulse received by the network at A will be delivered at its output C via the ungrounded horizontal line, if it is connected to the input A by a closed switch. The operation of the switch tubes shifts the ground in a manner that at every pulse a different horizontal line is ungrounded and in the course of eight vertical pulses each horizontal line becomes ungrounded for the duration of the pulse. Thus for every group of eight vertical synchronizing pulses, each horizontal line in the network transmits an ON or an OFF pulse, depending on whether it is connected to or disconnected from the input A. The switches 37 in the horizontal lines therefore determine the code, and by varying the ON or OFF position of the eight switches the code generated by the coder is determined.

It will now be understood that in this system the rectifier network type of binary coder generates a code and that the code generated is determined by the key code which gives the positions of the switches 37.

In operation, therefore, the vertical synchronizing pulses are delivered from generator 15 (FIGURE 1) to the rectifier network at input A and to input B of the scale-of-eight switching system. As these input pulses progress the switch tubes 33, 34 and 35 are activated by the scale-of-eight circuit and the diodes connected to the switch tube plates are correspondingly grounded. Inspection of the diagram of FIGURE 3 will show that, coincident with any particular input pulse, all of the horizontal wires in the diagram except one will be effectively grounded through diodes. This particular input pulse will pass through to output terminal C only if the switch S in the ungrounded horizontal wire is closed. Similarly, with succeeding input pulses, only one horizontal wire at a time is ungrounded and the pulse on that lead will pass to output terminal C only if the switch in that lead is closed. The cumulative effect of this action in the eight binary digit coder shown is to generate a sequence of groups of eight binary digits, represented by repeating groups of eight ON or OFF pulses, appearing at terminal C when a uniform succession of pulses is fed to coder input terminal A and to scale-of-eight driver circuit input B. When all switches are closed no pulses are deleted from the output, but when any particular switch S is opened the correspondingly-numbered pulse in the group of eight will be deleted from the output at the terminal C. Thus, at terminal C a series of code signal pulses is developed having an irregular time spacing determined at least in part by the instantaneous adjustment of code-determined switching apparatus 37. In practice, a slight delay is interposed in the pulses arriving at the input terminal A in order to allow sufficient time for the scale-of-eight switching action to become effective before the pulses appear at the input terminal A.

The purpose of the rectifier elements 38 in FIGURE 3 is to insure that the pulses appearing on any horizontal lead will not pass to the other horizontal leads.

The rectifier elements used in the diode binary coder may be germanium diodes, selenium elements, or any suitable unidirectional elements.

The previously mentioned code system synchronizing pulse, or reset pulse, is applied to the diode coder at input D in order to synchronize the coder operation with the corresponding coder operation at the subscribers' receiving stations. A source of these pulses is available at the transmitter and at all subscribers' stations. The reset pulse is preferably generated by frequency division from the vertical synchronizing pulse at the transmitter and transmitted in the same envelope with the video and conventional synchronizing pulses. These reset pulses perform the same service in the transmitter and in all receivers. Broadly, the reset pulses maintain all coder units energized in synchronism.

In the present system the reset pulses are generated at the transmitter by the frequency divider shown at 30 in FIGURE 1. The frequency of the reset pulse is determined by the number of binary digits or ON or OFF pulses in each code group generated by the coder unit 28, it being desirable to have one reset pulse for each group of code pulses. Thus when the coder unit generates an eight-digit code, it is desirable to have one reset pulse for every eight code digits. Since the code digits are synchronized with the vertical synchronizing pulses, there will be generated by the frequency divider one reset pulse for every eight vertical synchronizing pulses. Such pulse-frequency dividers are common in the art and will not be described in detail here. See "Waveforms," by Chance, Hughes, MacNichol, Sayre and Williams, Radiation Laboratory Series, vol. 19, chapter 17, McGraw-Hill Book Co., this being embodied here by reference.

As thus far described, the diode coder unit 28 shown in schematic form in FIGURE 3 may be set by proper adjustment of the switches S to deliver a predetermined code group of eight binary digits or ON or OFF pulses, the unit being triggered by the vertical synchronizing pulses and recycled at the group rate by the code system synchronizing pulse.

The groups of ON or OFF pulses constitute a jittering or phasing code for abnormal scanning of the picture converter 10. Alternately, these coded pulse groups can be used to effect irregular reversing of the polarity of the video signal, irregular direction of scanning or other abnormal switching.

The binary-coded pulse groups may also be used simultaneously for irregular switching of sound-scrambling devices to make the sound unintelligible as received on conventional television receivers unless corrected by correspondingly coded switching at the subscribers' receivers.

It should be pointed out that although for simplicity a coder unit is here described for the generation of groups of eight binary digits, the coder unit may readily be extended for the generation of say 16 or 32 binary-digit groups. In the case of the 16-digit coder, there would be over 65,000 scanning or switching codes available corresponding to different settings of the coding switches. With the 32-digit coder there would be over four billion possible code settings.

The binary coder effects irregular triggering of the electronic switch or control mechanism connecting alternately delayed and undelayed horizontal synchronizing pulses to scanning generator 20 for picture converter 10. The sequence of pulses from the binary coder triggers, in an irregular but adjustable fashion, the two-position electronic switch shown in FIGURE 4. Each successive pulse from the coder unit is applied to both of the input circuits of the electronic switch and thus causes V4*a* and V4*b* to conduct alternately; this action alternately turns on the switch tubes V3*a* and V3*b*. In other words, electronic switch or control mechanism 26 has two operating conditions and pulses are simultaneously applied to both of its two input circuits to effect operation thereof from its instantaneous condition, whichever one that may be, to its alternate condition. When either of these switch tubes conducts it effectively grounds the diode which is connected to its plate and prevents the pulse from the delay line from passing that diode to output terminal E. The electronic switch therefore alternately connects the terminals $D_0$ and $D_1$ of the delay line to output terminal E. The horizontal synchronizing pulses at the transmitter are fed to the delay line and the pulses appearing at terminal $D_0$ are undelayed, whereas those appearing at terminal $D_1$ are delayed by a fixed amount. To insure synchronous operation between the transmitter and the receivers, reset pulses from cycler 31 are applied to only one of the input circuits of electronic switch 26 to actuate it to a predetermined reference condition from time to time if it is not already established in that reference condition.

Figures 4, 5:
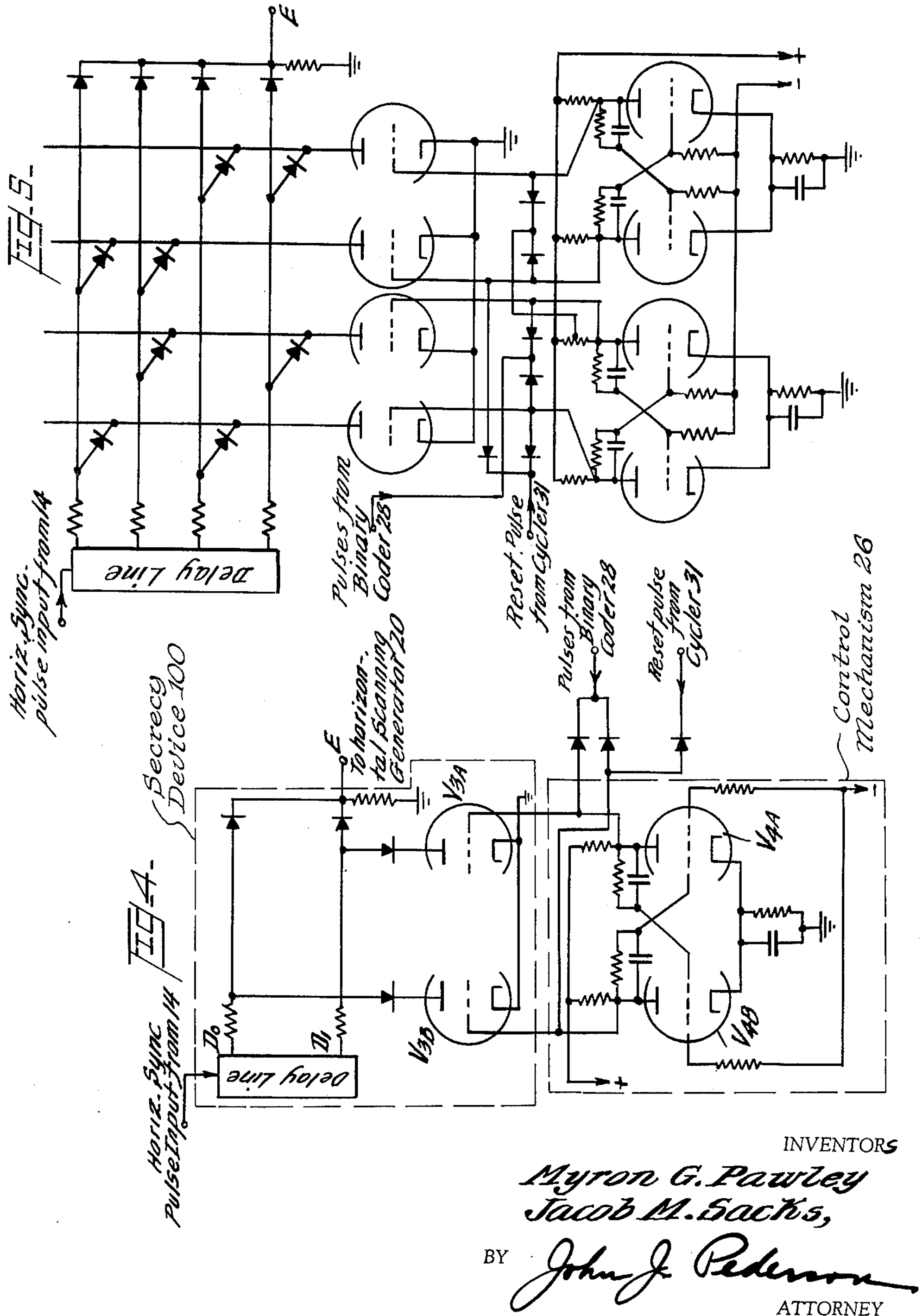
FIGURE 4 is a schematic showing of a two-position electronic switch.
FIGURE 5 is a schematic showing of a four-position electronic switch.

Since the delay line shown in FIGURE 4 and the circuitry of and including tubes V3*a* and V3*b* collectively cooperate to either delay the horizontal synchronizing pulses before application to scanning generator 20 or to translate them with no appreciable delay, such apparatus constitutes a secrecy device, labeled 100, having a plurality, specifically two, of distinct operating conditions each of which establishes a different operating mode in the system, namely a different time relationship between the video and radiated horizontal synchronizing components. Tubes V4*a* and V4*b* and their associated circuitry, which together form electronic switch 26, may also be considered a control mechanism having a plurality of stable operating conditions, specifically two, each effective to establish secrecy device 100 in an assigned one of its two operating conditions. Each one of tubes V4*a* and V4*b* has an input circuit for controlling its conductive condition and thus it may be stated that there are a plurality of input circuits for control mechanism 26, each selectively energizable to operate control mechanism 26 to a different assigned one of its operating conditions. Binary coder 28 and driver 29 constitute a first signal source including adjustable code-determining switching apparatus 37 for developing (at output terminal C) a first series of code signal pulses having an irregular time spacing determined in part by the instantaneous adjustment of code-determining switching apparatus 37 and cycler 31 may be considered a second signal source for developing a second series of code signal pulses, the first and second series of pulses collectively representing a code schedule.

The coupling circuitry between binary coder 28 and the input circuit of tube V4*b* may be considered means coupled to the first signal source and to one of the input circuits of control mechanism 26 for utilizing the code signal pulses of the first series to selectively energize that input circuit. Finally, the circuitry between cycler 31 and the input circuit of tube V4*a* constitutes means coupled to the second signal source and to another one of the input circuits for utilizing the code signal pulses of the second series to selectively energize the other input circuit. Consequently, the control mechanism is operated between its two operating conditions in accordance with the code schedule collectively represented by the pulses from binary coder and driver 28, 29 and from cycler 31.

If desired, a multi-sectional delay line may be used to provide for more than two operating modes. FIGURE 5 shows a three-section delay line and a four-position electronic switch or control mechanism. Its operation will be apparent from what has appeared above in connection with the description of FIGURES 3 and 4. In the operation of the electronic switches, the delivery of an ON pulse by the coder will cause the switch to operate so as to provide a new path for the horizontal synchronizing pulse to the output at E. An OFF pulse delivered by the coder permits the switch to remain in its previous position. The pulses appearing at output terminal E are therefore jittered in time at an irregular rate established by the setting of the coder switches at the transmitter. These jittered pulses are passed to the sweep generating circuit in the camera at the transmitter.

By inverting the position of the switches 37 in the diode binary coder or by varying the order of the switches, the number of individual coder units at the subscribers' receivers becomes enormous and it becomes practically impossible for a group of friends to rewire the coder units so that they may all operate on the same key code.

Figure 6:
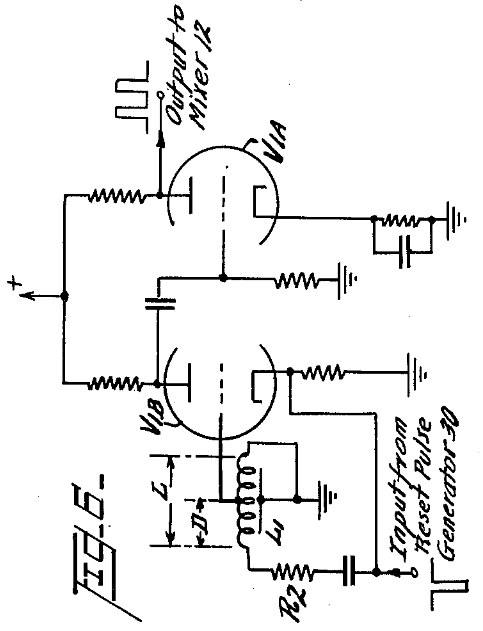
FIGURE 6 is a diagrammatic showing of a reset pulse double coder.

In order for the previously mentioned reset pulse to be identified and separated at the receiver it must be coded in some manner at the transmitter. FIGURE 6 is a schematic diagram showing reset pulses coder 32. This circuit receives the single pulse generated by frequency divider 30 and delivers the double-coded reset pulse to mixer 12. This type of circuit is similar to one shown in "Waveforms," by Chance, Hughes, MacNichol, Sayre, and Williams; Radiation Laboratory Series, vol. 19, p. 367; McGraw-Hill Book Company. Alternately, the reset pulse may be coded differently by methods well known to the art. See, for example, "Electronic Time Measurements," by Chance, Hulsizer, MacNichol, and Williams, Radiation Laboratory Series, vol. 20, p. 432; McGraw-Hill Book Company, this being embodied herein by reference.

Referring to FIGURE 6, delay line $L_1$ is matched by a resistor $R_2$ at its input end, is short-circuited at the other end, and has a tap D microseconds from the input end. A negative pulse applied to the input causes tube V1*b* to conduit by its action on the cathode, giving a negative pulse on its plate. The negative input pulse also travels through the delay line, is reflected as a positive pulse, and (2L–D) microseconds later arrives at point D, where L represents the total delay of the line and D represents the displacement of tap D from the input end. The delayed positive pulse on the grid results in a second negative pulse on the plate of V1*b*. The single negative input pulse is therefore coded into a double pulse with spacing of (2L–D) microseconds. Tube V1*a* serves as a phase-inverter to supply positive double-coded pulses to mixer 12. As will be explained later, this double-coded reset pulse may be decoded at the receiver by a similar circuit. The reset pulse is used at the receiver to synchronize the actions of the binary coder and electronic switch units with corresponding units at the transmiter.

Figure 10:
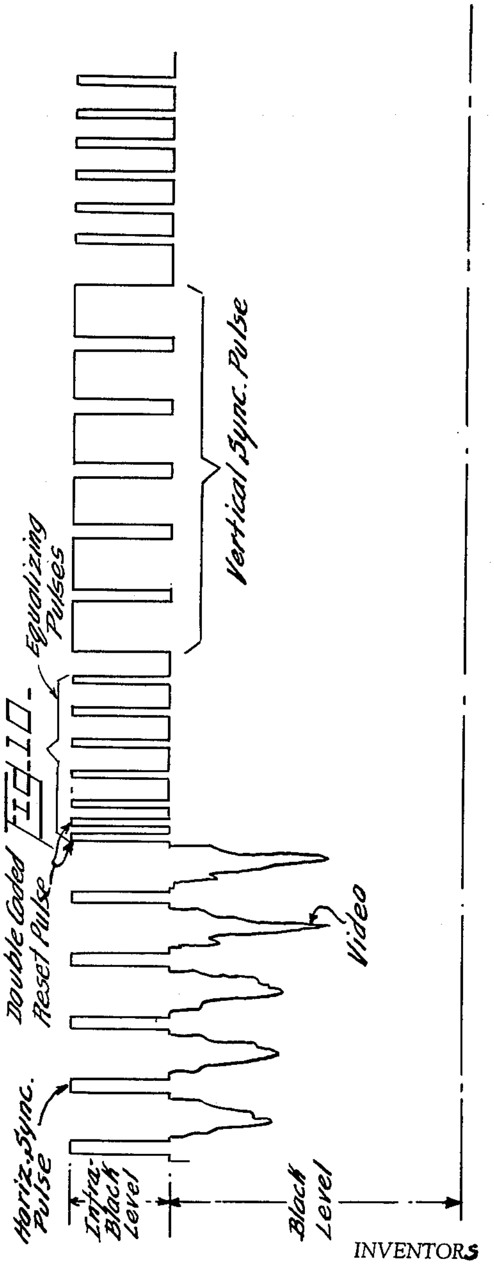
FIGURE 10 illustrates the broadcast waveform.

In the present system the binary coder at the transmitting station serves to insert a coded delay into the horizontal scanning and at the receiving station a similar coder inserts the same coded delay in the horizontal scanning with the result that the image received by the subscriber's station is undistorted. While the code is generated at each subscriber's station, the code system is maintained in phase with the code system of the transmitting station by the reset pulse which is transmitted together with the video and synchronizing signals. The reset pulse is preferably transmitted during the vertical retrace time between fields. During such retrace, equilizing pulses and the vertical synchronizing pulse are transmitted as shown in the approximate wave form shown in FIGURE 10. The double coded reset pulse is included in the group of signals that are transmitted during the retrace time, this reset pulse occurring there only at every eighth retrace time, when the number of digits in the code is eight.

FIGURE 2 is a block diagram of a receiving system embodying the present invention and, insofar as the items there shown correspond to the equivalent or the same items in FIGURE 1, the same reference characters are employed. In this system the signal is received and amplified by radio frequency amplifier 60 whose output is delivered to mixer or detector 61 which also receives the output of local oscillator 62. The sound signals are delivered by this detector in the direction indicated by the arrow and the legend "sound." The video and its accompanying synchronizing signals are delivered by mixer 61 to amplifier 63 which delivers its output to second detector 64 which in turn delivers its output to video amplifier 65. The video signals are delivered by amplifier 65 to D.C. restorer 66 and the video signals are delivered thereby to picture converter 10.

The composite synchronizing signal is delivered by amplifier 65 to composite synchronizing amplifier and separator 67. The separator delivers the vertical synchronizing signal to vertical synchronizing pulse oscillator 15 which in turn delivers its output to vertical scanning generator 19 which controls vertical scanning yoke 21. Separator 67 delivers the horizontal synchronizing component to horizontal synchronizing oscillator 14 which in the conventional receiver delivers its output to horizontal scanning generator 20, the latter being connected to horizontal scanning yoke 22.

The system as thus far described constitutes a conventional television receiving system.

In addition to the system as thus described, the present receiving system also contains a coder system which in its essential respects is substantially identical with the coder system at the transmitting station as described above. This system serves to code the horizontal sweep at the receiver in a manner identical with the coding of the camera horizontal sweep at the transmitting station, and as a result thereof the jittered video signal, which would be unintelligible or impossible to view normally by means of a conventional receiver, becomes converted into a normal picture at the subscriber's receiving station.

Alternatively, the coder unit at the receiver may effect irregular switching in synchronism with corresponding switching of polarity of video signals, direction of scanning, or other abnormal switching at the transmitter in order to derive an undistorted television image at the subscriber's receiver. The same coder unit at the receiver may simultaneously be used to unscramble the sound distorted by the coder unit at the transmitter.

In addition to receiving the jittered video signal, the subscriber station also receives a code system synchronizing pulse which for the sake of brevity is referred to as the reset pulse. Synchronizing pulse separator 67 delivers the vertical synchronizing pulse and the double-coded reset pulse to reset pulse separator 71 to be described later. From this composite signal reset pulse separator 71 delivers to cycler 31 the reset pulse in substantially the form as generated by frequency divider 30 of the transmitting station. The reset pulse separator thus constitutes a source of reset pulses which serve the same functions at the receiver as they served at the transmitter.

Cycler 31 shown in FIGURE 2 delivers the reset pulses to driver 29 and to electronic switch or control mechanism 26 in order to synchronize these units with the corresponding units at the transmitter.

As in FIGURE 1, the two dot and dash lines in FIGURE 2 connected to coder unit 28 indicate the connection of the two different types of coder units that may be employed. If the coder unit employs the rectifier network described, then it receives vertical synchronizing pulses by one of the dashed lines and it is not connected to cycler 31. If, however, the magnetic binary coder is employed then it is energized by the reset pulse delivered by cycler 31 and the coder unit is not connected to vertical oscillator 15.

Horizontal synchronizing generator 14, instead of being connected directly to horizontal scanning generator 20, is connected to delay line 23 which has two output lines supplying zero-delay and fixed-delay pulses. Electronic switch or control mechanism 26, controlled by binary coder unit 28, connects, in an irregular fashion, either one or the other of the output terminals of the delay line with the horizontal scanning generator.

It will now be understood that with the switches of coder unit 28 at the subscriber station set so as to generate the same binary coded group of pulses or coding pattern of signals as that produced by the coder unit at the transmitter, the scanning delays at the subscriber station will operate in the same manner and in synchronism with the scanning delays at the transmitter.

Figure 7:
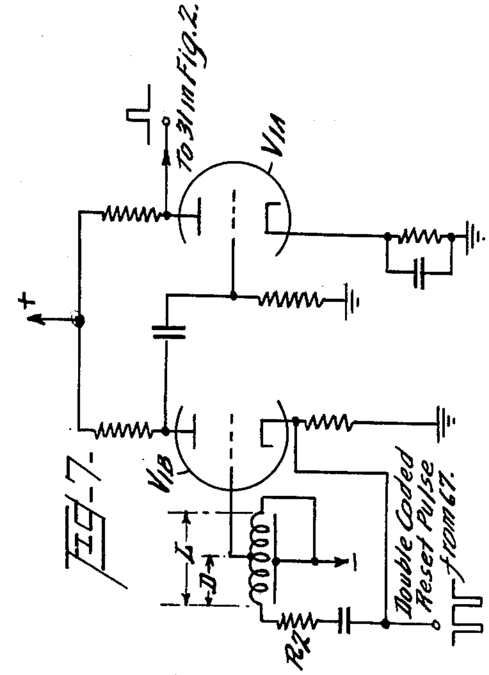
FIGURE 7 is a diagrammatic illustration of a reset pulse separator.

It will now be understood that the coder system at the subscriber's station operates in substantially the same manner as the coder system at the transmitting station and that it comprises the same components except that it does not contain frequency divider 30 and double-pulse coder 32 but in lieu thereof it contains reset pulse separator 71. Component 71 is shown in schematic form in FIGURE 7 and will also be found in "Waveforms," by Chance, Hughes, MacNichol, Sayre and Williams, Radiation Laboratory Series, vol. 19, p. 367, McGraw-Hill Book Company, 1949. Except for the biasing arrangement, the circuit of FIGURE 7 is identical with that of the double-pulse coder shown in FIGURE 6 which was previously described in detail. The single dual-triode shown in FIGURE 7, together with its associated delay line, accepts a coded reset or cycling pulse consisting of two closely and accurately spaced pulses generated by the reset pulse coder at the transmitter. The reset pulse separator rejects pairs of pulses except when their spacing corresponds exactly with the delay introduced by the delay line in the separator. The coded cycling or reset pulse is separated from the composite synchronizing pulse input and passes to cycler 31 shown in block form in FIGURE 2 or as shown in greater detail in FIGURE 8.

The advantages of the present system will now be apparent to persons skilled in the art. The present system provides a subscriber television system in which no mechanically movable elements are employed and in which all necessary signals are transmitted in the same envelope as in conventional television.

Figure 8:
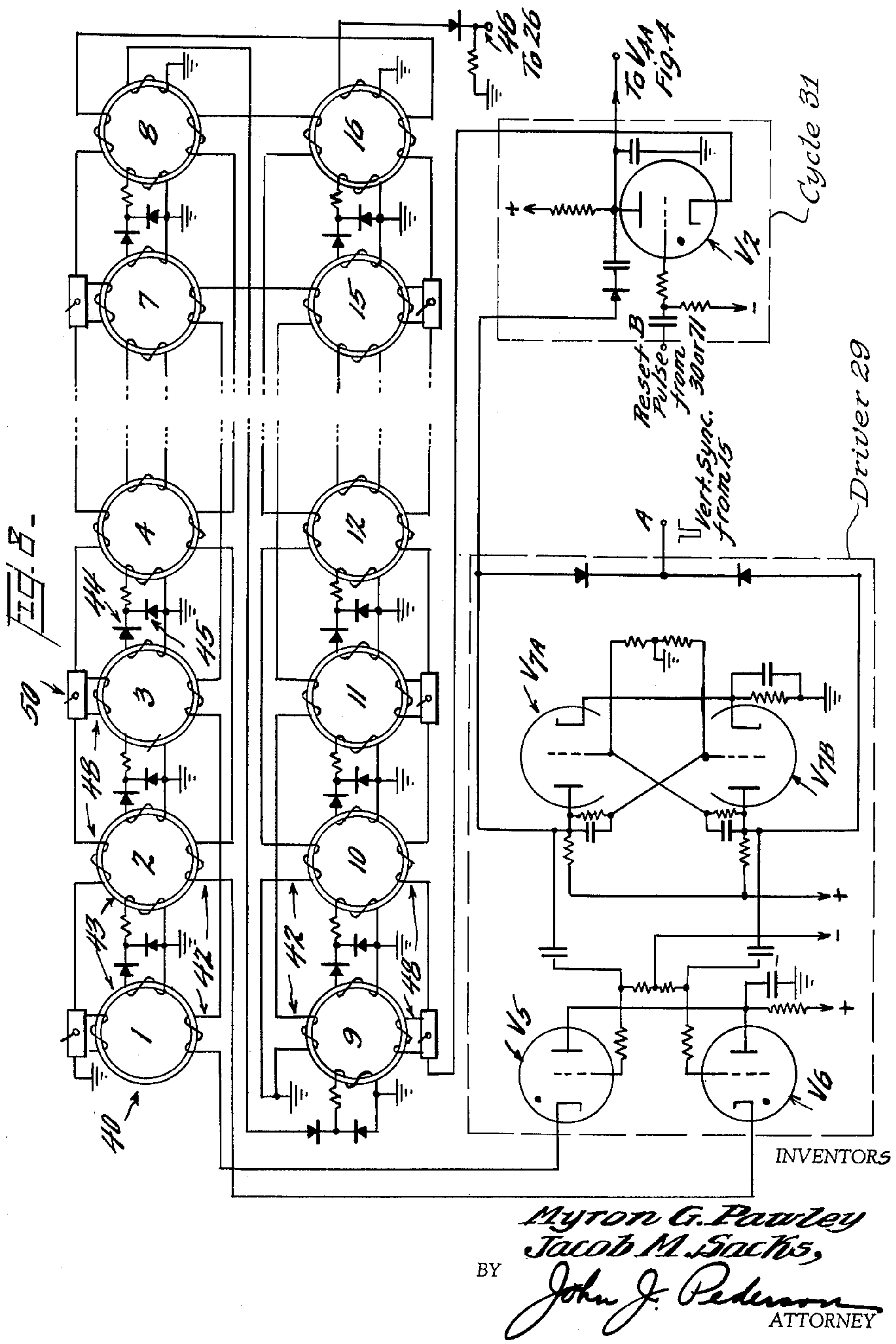
FIGURE 8 is a diagrammatic showing of one form of a magnetic binary coder.
Figure 9:
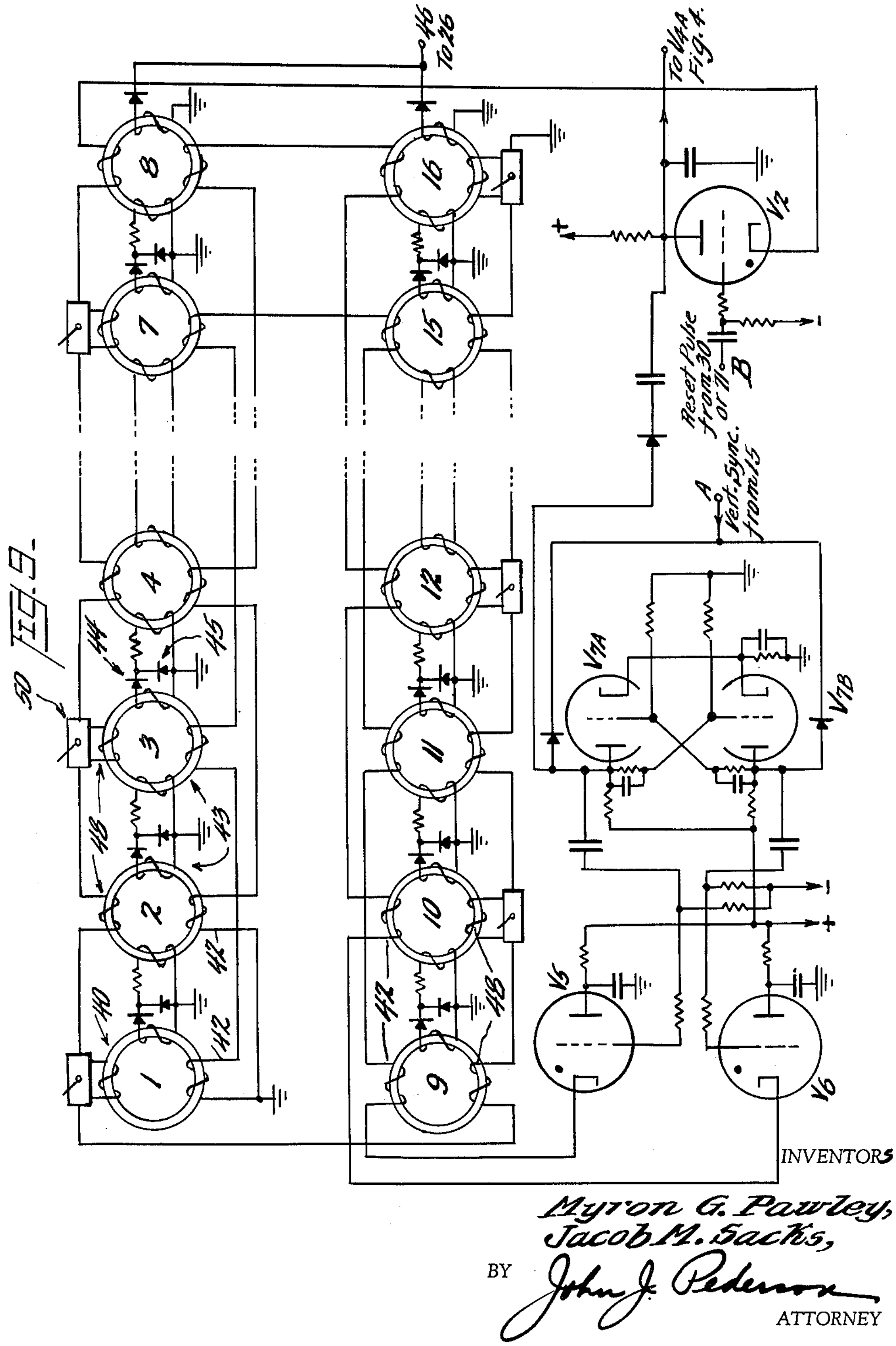
FIGURE 9 is a diagrammatic showing of another form of a magnetic binary coder.

If desired, instead of using the diode binary coder unit as described above, a magnetic binary coder unit as shown in FIGURES 8 or 9 may be employed as an alternate device for deriving the coded pulse sequences to serve the purpose of this invention at the transmitter and at the subscribers' receivers.

The present magnetic coder unit is derived from a magnetic device whose operation is disclosed in a paper entitled "Static Magnetic Storage and Delay Line" by An Wang and Way Dong Woo, Journal of Applied Physics, January 1950, pp. 49–54, inclusive, and the same is embodied herewith and made a part of the present specification by reference.

For simplicity, the particular arrangement illustrated in the drawings and to be described generates successive groups of 8 binary digits represented by ON or OFF pulses, but it is clear that the coder unit may readily be enlarged or extended so as to produce groups of any required number of binary digits with optional switch arrangements for setting up the scanning code in correspondence with a key code for the switches.

Referring to FIGURE 8, the coder unit includes 16 or any other desirable even number of magnetic toroids 40. To satisfy the principle of operation of the device as shown and described by the authors Wang and Woo, each toroid has first a winding 42, the windings of the odd numbered toroids being connected together in series and to the cathode circuit of the driving tube here shown as the thyratron V5, whereas windings 42 of the even numbered toroids are similarly connected together and to the cathode circuit of the other driving tube also shown as a thyratron V6. Each pair of adjacent toroids also has a pair of connected windings 43 which are connected together in the manner shown by means of rectifying diodes 44 in series between the windings and rectifying diodes 45 across the windings 43.

The coder unit as thus far described corresponds to the device disclosed and described by the authors Wang and Woo. When in this system the toroids are magnetized to saturation, alternate delivery of pulses by tubes V5 and V6 will produce at the output end of the system, mainly at line 46, a group of ON or OFF pulses depending upon the direction of magnetization of the several toroids. In its present adaptation, and particularly for the purpose of the present invention, each toroid is additionally provided with a winding 48, as shown in FIG. 8, these being connected in series through double-pole, double-throw toggle switches 50, which are connected to the odd-numbered cores, and thence to the cathode circuit of thyratron tube V2. Thyratron tube V2 and its immediately associated elements constitute the cycler shown at 31 in the block diagram of the transmitter system shown in FIG. 1. The coder unit driver shown at 29 in the block diagram of FIG. 1 comprises the scale-of-two tubes V7*a* and V7*b* together with the previously referred to thyratron tubes V5 and V6. The negative vertical synchronizing pulses are delivered to therminal A of the scale-of-two stage and the thyratrons V5 and V6 are consequently energized alternately and deliver pulses alternately to the odd and even-numbered windings 42 of the magnetic binary coder unit.

Input terminal A of the 8-digit binary coder receives a sequence of regularly spaced pulses, say at a rate of 60 per second. At output terminal 46 pulses will appear at a regular 30 cycle rate only if the 8 toggle switches are set in the "up" position. If we consider a time interval corresponding to 16 consecutive input pulses and number the switches 1 to 8, the setting of any toggle switch in the "down" position will remove the correspondingly numbered pulse of the sequence of 8 from the output. Since there are two possible ways in which each of the 8 switches may be set, there are $2^8$ or 256 distinct sequences of pulses which may be set up in consecutive groups of 8 equally spaced time intervals of $\frac{1}{30}$ second, provided the special cases of continuous pulses with all switches "up" and no pulses with all switches "down" are included. As indicated above, the arrangement may readily be extended by adding more small saturable reactors and switches. Considered in groups of "$n$" equally spaced time intervals, there would then be $2^n$ different pulse sequences available. In a practicable example "$n$" might be equal to 20 and $2^n$ then would equal 1,048,576.

The magnetic binary coder unit is shown in FIG. 8 with 16 small saturable reactors and 8 associated double-pole, double-throw reversing toggle switches, together with the required tubes V5, V6, and V7 for driving the reactors. The coder unit is only one component of the subscription-type television system shown in FIGURES 1 and 2. The remainder of the circuit is identical with that used with the diode binary coder previously described.

As shown in the schematic of FIG. 8 the windings 48 of the reactors in the coder unit are connected in series with a reversing switch 50 provided for each odd-numbered reactor so that the core of the latter reactors can be polarized in the desired direction. The magnetic material used in these reactors saturates very rapidly as the magnetizing current is increased, and has very high retentivity and an approximately square hysteresis loop. This means that once the core is magnetized in a particular polarity, further pulses of magnetizing current in the same direction will not change the flux and no induced voltage will appear across the windings. However, a pulse of current of sufficient amplitude in the reverse direction will "flip" the magnetization over to the opposite saturated polarity and result in a relatively large pulse of induced voltage across the reactor windings.

We shall assume that uniformly spaced pulses at a 60 cycle rate are applied to the circuit of FIG. 8 at A, and that the reset pulses from V2 occur coincident with every 16th of the 60 cycle input pulses.

There are 256 different up-down positions in which the switches can be mounted, but in this example the switches will be arranged so that all of the reactor cores are magnetized in the same saturated polarity by the reset or cycling pulse when all of the switches are "down," or in the opposite saturated polarity when all of the switches are "up."

The regular input pulses at A are applied to scale-of-two stage V1*a*–V7*b* which alternately triggers the miniature thyratrons V5 and V6. The odd-numbered reactor have windings connected in series with the cathode of V5 and ground, and the even-numbered reactors have windings connected in series with the cathode of V6 and ground. As the input pulses progress, alternate cores in the chain are energized by the alternate firing of thyratrons V5 and V6. The polarities of the windings and the inter-connections are such that these "advancing pulses" applied to windings 42 of the reactors cause a pulse to be passed from any odd-numbered core which has its toggle switch in the "up" position successively to cores to the right, through the chain of cores and thence to the output terminal 46. The sequence of 8 binary digits will continue with the same pattern for successive groups of 16 input pulses as long as the switch positions are not changed. When all of the switches are "up," pulses will appear continuously at the 30 cycle rate at the terminal 46. If any toggle switch is turned "down" the pulse from that particular core will be removed from the sequence. Finally, if all switches are "down," no pulses will appear at 46.

We now have a device for coding a uniform sequence of input pulses into a sequence of groups of binary digits represented by successive groups of ON and OFF pulses.

The purpose of the rectifier elements 44 and 45, which may be germanium diodes, selenium elements, or other rectifying elements, is to insure that the advancing pulses move digits only in the forward direction, and only one core at a time in this direction.

A more detailed explanation of the operation of this magnetic circuit is given in the reference cited above.

One feature of the coding system is the code system synchronizing pulse or reset pulse. A source of these pulses is available at the transmitter and at all subscribers' stations. This reset pulse is preferably generated from the vertical synchronizing pulse at the transmitter and transmitted in the same envelope with the video and conventional synchronizing pulses. These reset pulses perform the same services in the transmitter and in all receivers. Broadly, the reset pulses maintain all coder units energized in synchronism in a fashion identical with that described above in connection with the diode binary coder.

In the preferred system reset pulses are generated at the transmitter, by frequency divider 30. The frequency of the reset pulse is determined by the number of ON or OFF pulses in each code group generated by coder unit 28, it being desirable to have one reset pulse for each group of code pulses. Thus when the coder unit generates an eight pulse code, it is desirable to have one reset pulse for every eight code digits. The code digits in the magnetic coder being synchronized with every other vertical synchronizing pulse, there will be generated by the frequency divider one reset pulse for every sixteen vertical synchronizing pulses. Such pulse-frequency dividers are common in the art and will not be described in detail here.

The reset pulses are delivered to cycler 31, which, as shown in FIG. 8 consists essentially of thyratron tube V2 and is in turn connected to code input windings 48. Thus it will now be understood that for the first, seventeenth, etc., vertical synchronizing pulse a reset pulse passes through all windings 48 and, depending upon the direction of the winding of each odd-numbered core and the position of its associated switch 50, these magnetic cores will be polarized in one direction or another. The cycler as represented by thyratron V2 also delivers each reset pulse to tube V7*a* of the scale-of-two driver stage and to V4*a* of the electronic switch. The reset pulses serve to synchronize the binary coder unit and the control mechanism or electronic switch with the corresponding units when properly coded at the subscriber's television receiver.

As thus far described, coder unit 28 shown in schematic form in FIG. 8 may be set to deliver a predetermined code group of 8 ON or OFF pulses, the unit being triggered by the vertical synchronizing pulses and being controlled by the reset or code system synchronizing pulses which are delivered by cycler 31 to code input windings 48. The reset pulses are also delivered to coder unit driver 29 and to electronic switch or control mechanism 26 for the purpose of synchronization.

The groups of ON or OFF pulses constitute a jittering or phasing code for abnormal scanning of the picture converter 10.

As explained above, the output from the magnetic binary coder consists of a repetitive group of binary digits, each group consisting of a sequence of 8 equally spaced ON or OFF pulses depending upon how the 8 switches are set. This sequence of pulses triggers, in an irregular but adjustable fashion, the 2-position electronic switch shown in FIG. 4. Each successive pulse causes V4*a* and V4*b* to conduct alternately and this action alternately turns on the switch tubes V3*a* and V3*b*. When either of these switch tubes conducts, it effectively grounds the diode which is connected to its plate and prevents the pulse from the delay line from passing that diode to output terminal E. The electronic switch therefore alternately connects the terminals $D_0$ and $D_1$ of the delay line to the output terminal E. The horizontal synchronizing pulses at the transmitter are fed to the delay line and the pulses appearing at the terminal $D_0$ are undelayed, whereas those appearing at the terminal $D_1$ are delayed by a fixed amount. The pulses appearing at output terminal E are therefore jittered in time at an irregular rate established by the setting of the coder switches at the transmitter. These jittered pulses are passed to the sweep generating circuit in the camera at the transmitter.

The above described action of the magnetic binary coder and associated electronic switch and delay line is similar to the action of the diode binary coder and auxiliary apparatus as previously described. The coding differs somewhat with the magnetic coder as shown in FIG. 8 as compared with the coding derived with the diode coder of FIG. 3. In the latter case the code consisted of repeating groups of 8 binary digits, the digits occurring at a rate of 60 per second, whereas with the magnetic coder 8 binary digits occur at a rate of 30 per second.

In an alternate connection of the magnetic reactors of the magnetic binary coder as shown in FIG. 9, the 8-digit binary code groups are identical with those generated by the diode binary coder of FIG. 3 which was previously described.

In the circuit of FIG. 9 the sixteen magnetic reactors are operated in two groups of eight reactors switched in parallel. The interconnections are such that when the sequence of vertical synchronizing pulses at a rate of 60 per second are applied to input A of the scale-of-two driver there are derived at output terminal 46 repeated groups of eight binary digits represented by ON or OFF pulses occurring at a rate of 60 digits per second. With the parallel form of the magnetic coder as shown in FIG. 9, reset pulse generator 30 (at the transmitter) is designed to generate one pulse for every eight vertical synchronizing pulses. The separated reset pulse at the subscriber's receiver is applied to input terminal B of cycler 31 (V2) which in turn delivers reset pulses to the scale-of-two driver to input windings 48 of the magnetic reactors, and to electronic switch 26 (V4*a*, FIG. 4).

The binary-coded pulses from the output terminal 46 of the magnetic binary coder of FIG. 9 are used, as with the previously described binary coders, to control electronic switch 26 to effect abnormal scanning or other abnormal switching as previously discussed. At the subscriber's receiver the same magnetic binary coder unit may be used to properly phase the switching functions in the receiver with those at the transmitter in order to receive undistorted images on the screen.

By varying the direction of winding of code input or energizing windings 48 or by varying the order of switches 50, the number of individual coder units becomes enormous and it becomes practically impossible for a group of friends to rewire the coder units so that they may all operate on the same key code.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A subscription television system comprising: a secrecy device having a plurality of distinct operating conditions each of which establishes a different operating mode in said system; a control mechanism coupled to said secrecy device and having a plurality of stable operating conditions, each effective to establish said secrecy device in an assigned one of its aforesaid operating conditions; a plurality of input circuits for said control mechanism, each selectively energizable to operate said control mechanism to a different assigned one of its aforesaid operating conditions; a first signal source including an adjustable code-determining switching apparatus for developing a first series of code signal pulses having an irregular time spacing determined at least in part by the instantaneous adjustment of said code-determining switching apparatus; a second signal source for developing a second series of code signal pulses, said first and second series of pulses collectively representing a code schedule; means coupled to said first signal source and to one of said input circuits for utilizing the code signal pulses of said first series to selectively energize said one input circuit; and means coupled to said second signal source and to another one of said input circuits for utilizing the code signal pulses of said second series to selectively energize said other input circuit whereby said control mechanism is operated between its aforesaid operating conditions in accordance with said code schedule.

2. A subscription television system comprising: a secrecy device having a plurality of distinct operating conditions each of which establishes a different operating mode in said system; a bi-stable control mechanism coupled to said secrecy device and having two stable operating conditions, each effective to establish said secrecy device in an assigned one of its aforesaid operating conditions; a first input circuit for said control mechanism energizable to operate said control mechanism to a predetermined one of its two operating conditions; a second input circuit for said control mechanism energizable to operate said control mechanism to the other one of its two operating conditions; a first signal source including an adjustable code-determining switching apparatus for developing a first series of code signal pulses having an irregular time spacing determined at least in part by the instantaneous adjustment of said code-determining switching apparatus; a second signal source for developing a second series of code signal pulses, said first and second series of pulses collectively representing a code schedule; means coupled to said first signal source and to both said first and second input circuits for utilizing the code signal pulses of said first series to effect operation of said control mechanism from its instantaneous condition, whichever one that may be, to its alternate condition; and means coupled to said second signal source and to said second input circuit for utilizing the code signal pulses of said second series to effect operation of said control mechanism to said other operating condition if said control mechanism is not already established in that operating condition.

3. A subscription television system for receiving a scrambled picture transmission, wherein picture signals are transmitted in one of a plurality of different modes during different time periods which occur at a rate sufficient to render an unauthorized receiver display unintelligible and wherein signals are transmitted representing the operation of commutation means at the transmitting means comprising: means for resolving the different modes of said picture signals, means including commutation means coupled to the resolving means for determining from time to time the mode resolved in the resolving means, means for detecting the transmitted signals and coupled with the commutation means for maintaining synchronization of the receiver commutation means with corresponding commutation means at the transmitting means, and changeable matrix means connected between the mode resolution means and the receiver commutation means for determining the mode to be resolved for given states of the commutation means.

References Cited by the Examiner

UNITED STATES PATENTS

| | | | |
|---|---|---|---|
| 2,557,581 | 6/1951 | Triman | 340—147 |
| 2,573,349 | 10/1951 | Miller et al. | 340—147 |
| 2,594,731 | 4/1952 | Connolly | 340—174.1 X |
| 2,816,156 | 6/1957 | Pawley et al. | 178—5.1 |
| 2,833,850 | 12/1957 | Bartelink | 178—5.1 |

NEIL C. READ, *Primary Examiner.*

EVERETT R. REYNOLDS, STEPHEN W. CAPELLI, *Examiners.*